United States Patent

[11] 3,528,384

| | | |
|---|---|---|
| [72] | Inventor | Walter L. Lechner<br>New Providence, New Jersey |
| [21] | Appl. No. | 778,376 |
| [22] | Filed | Nov. 7, 1968<br>Continuation-in-part of Ser. No.<br>737,627, June 17, 1968, abandoned. |
| [45] | Patented | Sept. 15, 1970 |
| [73] | Assignee | Worthington Corporation<br>Harrison, New Jersey<br>a corporation of Delaware |

[54] VISUAL INDICATOR FOR FLUID OPERATED SYSTEM
7 Claims, 12 Drawing Figs.

[52] U.S. Cl. ............................................. 116/117,
73/228, 251/59
[51] Int. Cl. ............................................. G01f 15/00
[50] Field of Search ................................... 116/114,
117, 129; 73/252, 255, 258, 239, 196; 137/557;
251/59

[56] References Cited
UNITED STATES PATENTS

| 434,386 | 8/1890 | Frizell | 251/59X |
|---|---|---|---|
| 1,249,120 | 12/1917 | Knight | 73/228 |
| 1,850,901 | 3/1932 | Sturtz, Jr. | 73/252 |
| 2,322,883 | 6/1943 | Reichel | 73/228 |

Primary Examiner—Louis J. Capozi
Attorney—Daniel H. Bobis

ABSTRACT: A visual indicator for indicating the occurrence of fluid flow in two fluid flow lines. The indicator is a three-piece construction which includes a rotatable indicating element which is inherently self-centering and supported by point contact at one end of the element and line contact at another area of the element. Inlet ducts in the base of the device maximize the torque exerted on the indicating element by the fluid flowing in the fluid flow lines.

Patented Sept. 15, 1970
3,528,384
Sheet 1 of 2
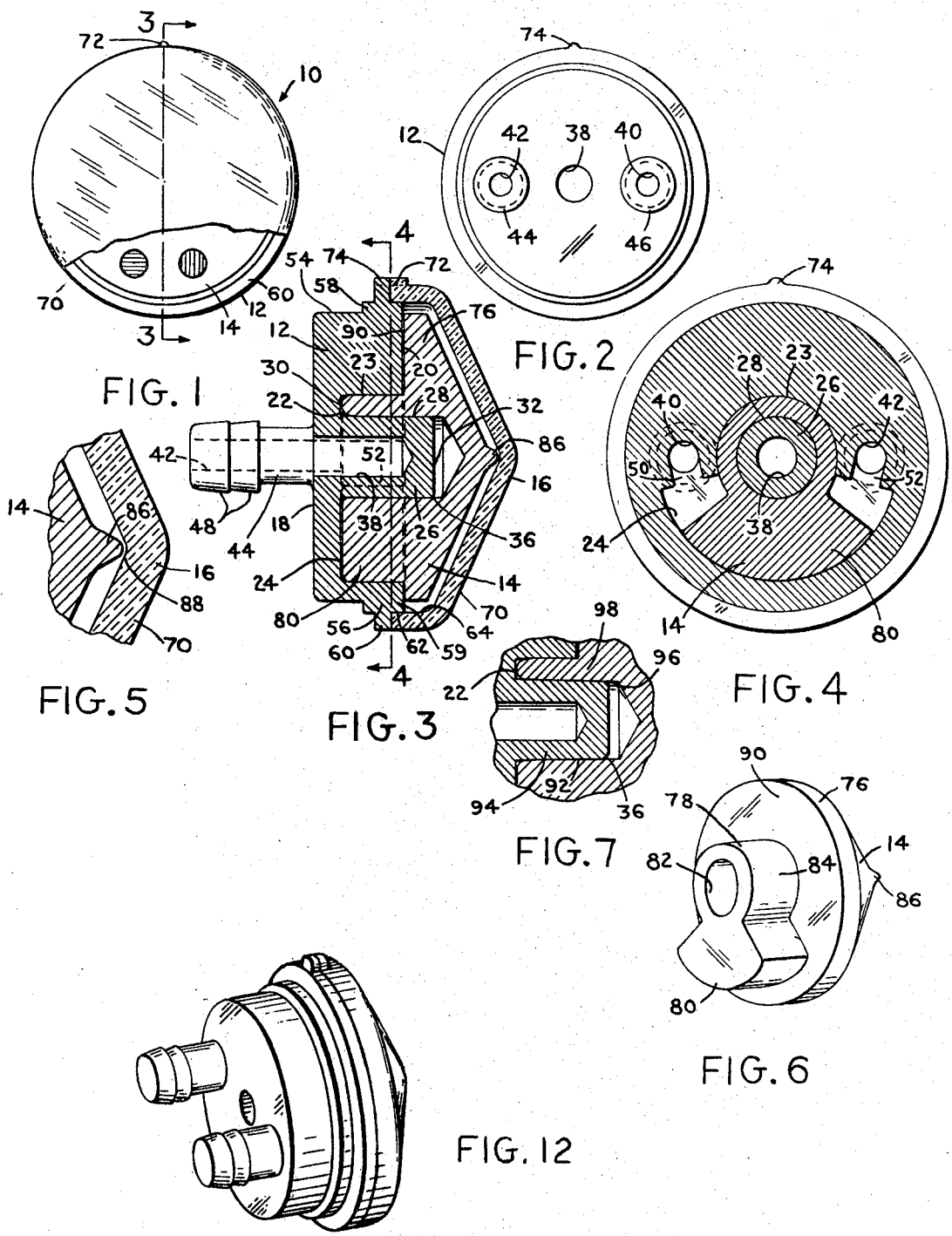
WALTER L. LECHNER
INVENTOR.
BY Daniel H. Bobis
Atty Patented Sept. 15, 1970

3,528,384

WALTER L. LECHNER
INVENTOR.

BY Daniel H. Bobis
Atty 3,528,384

VISUAL INDICATOR FOR FLUID OPERATED SYSTEM

CROSS REFERENCE TO RELATED APPLICATIONS

This is a continuation-in-part of application Ser. No. 737,627, filed June 17, 1968 now abandoned.

BACKGROUND OF THE INVENTION

1. Field of the Invention

This device relates to sight indicators to show the flow of a fluid in pneumatic or hydraulic systems.

2. Description of the Prior Art

Numerous indicating devices have been designed in the past to indicate the flow in fluid carrying conduits. These devices were usually placed in parallel to the conduit sought to be monitored and a small portion of the fluid in the conduit was shunted through the device and then back to the conduit. An example of such a device is shown in the U.S. Pat. No. 1,249,120 issued to W. C. Knight on December 4, 1917. The Knight patent discloses a liquid flow indicator having a sealed case with a cylindrical rotatable element mounted on a cylindrical trunnion and a vane projecting from the surface of the rotatable element. Passage of liquid from the inlet to the outlet tends to move the vane past the outlet to allow for a continuous flow through the chamber. A counterweight also mounted on the rotatable member tends to position the vane close to the inlet of the chamber. The main problem with this construction is that the force of the liquid which enters the chamber from the rear tends to cock the rotating member on the trunnion and thereby jam the indicator in a fixed position.

FIGS. 5 through 7 of the patent to Knight show a different construction in which the trunnion has been replaced and the rotating member is now composed of several pieces formed together in a composite construction. The disadvantage of this construction is that the pin connection used to mount the rotating member at either end of the casing is a fairly delicate device requiring careful fabrication of the device in order to assure proper alignment of the location of the pin receptacle in either end of the casing. Additionally, the pin connections are fragile and subject to damage during normal working conditions associated with many fluid indicator installations.

SUMMARY OF THE INVENTION

In order to overcome these difficulties the applicant has provided a simple, rugged fluid indicator which is capable of indicating flow in two separate alternative flow paths. The apparatus consists of a closed casing with dual fluid inlet ports and a rotatable indicating member mounted at one end of the casing on a trunnion extending from the casing. The rotating member is mounted at the other end by a pin connection to the cover of the indicator to allow for stable positioning of the indicating member thereby avoiding cocking or misalignment of the member on the mounting trunnion, which is the primary means for support of the rotating member. The tendency for cocking and misalignment of the indicating member is further reduced by the design of the dual inlets to the casing. The fluid which actuates the indicating member is introduced to the casing in such a manner as to minimize the axial forces exerted on the indicating member while maximizing the torque exerted on the indicating member. Therefore, the indicating member functions smoothly and reliably in a manner similar to that of a rotating member connected at both ends by means of pin connections. At the same time, however, the indicating member is solidly mounted upon a trunnion to provide rugged and durable support for the indicating member to withstand the adversities encountered during the normal service of such a device.

Accordingly, it is an object of the present invention to provide an apparatus for indicating the alternative flows in two separate fluid flow conduits.

It is another object of the present invention to provide a fluid flow indicating device to indicate oppositely directed flows in a single fluid carrying conduit.

It is a further object of the present invention to provide a fluid flow indicating means of simplified construction for indicating alternative flows in separate fluid flow conduits.

Another object of the present invention is to provide a fluid flow indicating apparatus for indicating the existence of fluid flow in either of two alternative fluid flow paths and which does not require internal springs or resilient means for biasing the indicating device in any predetermined position.

Yet, another object of the present invention is to provide a fluid flow indicator having a rotatable indicating member which is relatively free from jamming or misalignment during operation of the device.

Still a further object of the present invention is to provide a fluid flow indicator of simplified construction having a rotatable indicating member supported at more than one point along the axis thereof.

Yet, a further object of the present invention is to provide a fluid flow indicating apparatus of simplified construction.

Yet, another object of the present invention is to provide a simplified fluid flow indicating apparatus which is relatively trouble free and possesses a high degree of dependability in operation.

Still another object of the present invention is to provide a fluid flow indicating apparatus which is constructed to be manufactured cheaply and easily by the most modern of manufacturing methods.

Other objects and advantages will be apparent from the following description of several embodiments of the invention and the novel features will be particularly pointed out hereinafter in the claims.

BRIEF DESCRIPTION OF THE DRAWINGS

FIG. 1 is a plan view partially broken away of the top of a fluid indicator constructed in accordance with the present invention.

FIG. 2 is a plan view showing the bottom of the fluid indicating device described herein.

FIG. 3 is a side elevation in cross section taken along lines 3-—3 of FIG. 1.

FIG. 4 is a cross sectional view of the device described herein taken along lines 4—4 of FIG. 3.

FIG. 5 is an enlarged view of the front of the indicator as shown in FIG. 3.

FIG. 6 is a perspective view from the rear of the indicating member of a fluid indicator constructed in accordance with the present invention.

FIG. 7 is a sectional view of a portion of a second embodiment of an indicator constructed in accordance with the present invention.

FIG. 12 is a perspective view from the rear of the indicator shown in FIGS. 1 and 3.

DESCRIPTION OF THE PREFERRED EMBODIMENTS

Figure 8:
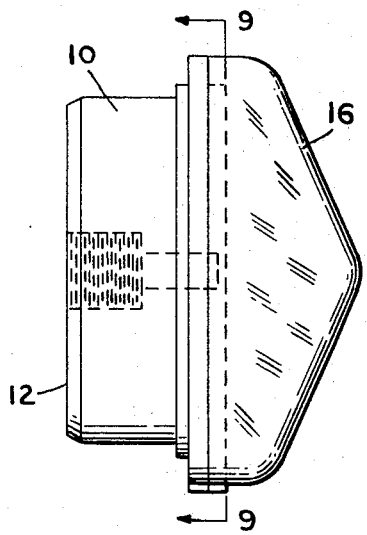
FIG. 8 is a side elevation of another embodiment of the visual indicator.
Figure 9:
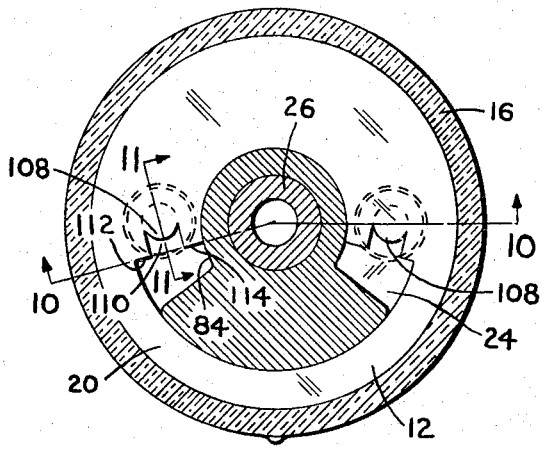
FIG. 9 is a plan view in cross section taken along lines 9—9 of FIG. 8.

As shown in FIGS. 1 through 6 a visual indicator for fluid operated systems generally indicated at 10 is composed of three elements, a base member 12, a rotating indicator member 14 and a cover member 16.

The base member 12 is generally cylindrical in shape, having a flat back surface 18, and a generally flat front surface 20, with an annular channel 22 disposed concentrically about the axis of the cylinder. The annual channel has an enlarged lower section forming an arcuate trough 24, and both the annular channel and the trough are disposed about a cylindrical mounting trunnion 26 which protrudes above surface 20 of the base from the bottom 30 of annular channel 22. Mounting trunnion 26 ends in a flat surface 32 which is faired into the circumferential surface 28 of the mounting trunnion by means of a chamfer 36. An axial bore 38 extending partially into the trunnion is formed during the manufacturing process of the base member.

The base member has two inlets 40 and 42 left and right respectively when viewed from FIG. 4. Each inlet consists of a column, 44 and 46 for left and right inlet respectively, extending from back surface 18 of base member 12, a series of lips 48 protruding from the end of each column to facilitate connection of hoses or other means for delivering air to the respective inlet.

Connecting passages 50 and 52 respectively connect left and right inlet bores 40 and 42 with the left and right ends of arcuate trough 24 to allow communication of fluid entering inlet passage 40 with the left end of arcuate trough 24 and fluid entering inlet passage 42 with the right end of arcuate trough 24.

The outer circumferential surface 54 of base member 12 has a stepped flange 56 thereon composed of smaller flanges 58 and 59 and a larger flanged portion 60. Smaller flange 58 is used in conjunction with the larger flange for mounting the base member 12 in a panel board which would be a typical installation for this type of device. Larger flange 60 is used in conjunction with smaller flange 59 to mount and attach cover member 16 to base member 12.

Cover 16 is composed of a transparent material and is formed in a conical front section 70 and a cylindrical end section 62. Alignment of cover member 16 with base member 12 in the proper position for relative disposition of any markings on the cover member with respect to the base member is assured by aligning two small projections 72 and 74 on the cover and base member respectively.

Indicating member 14 is formed in three sections, a conical front section 76, a tubular mounting section 78 and a vane counterweight 80 formed with and extending radially outwardly from tubular mounting section 78. The diameter of the bore 82 of tubular section 78 is slightly greater than the diameter of the outer cylindrical surface 28 of mounting trunnion 26, and the diameter of the outer wall 84 of tubular section 78 is slightly less than the diameter of the outer surface 23 of annular channel 22 so as to provide a loose sliding fit between the indicating member 14 and the base member 12.

As can be seen from FIGS. 3 and 4, the indicating member 14 fits loosely on mounting trunnion 26 with the vane counterweight 80 disposed within arcuate trough 24. FIG. 4 shows that vane counterweight 80 is of a shape which corresponds to the shape of the arcuate trough 24 but which is of a shorter length, so that the counterweight is free to swing within the arcuate trough.

As shown in FIG. 5 a nib 86 is disposed at the tip of the conical front section of indicating member 14 and is coaxial with the axis of the conical section 70 and tubular section 78. This nib fits within a receptacle 88 formed by the apex of cone shaped portion 70 of the inner surface of cover member 16. The radius of curvature of nib 86 is slightly less than the radius of curvature of the receptacle 88 so that a nib will fit loosely into and be supported by the receptacle during rotation of the indicating member 14.

OPERATION

The indicator member 10 is mounted at an inclination to the horizontal in a control board and inlet columns 44 and 46 are connected to a separate source of fluid flowing in this system. When there is no flow of fluid in the system, the vane counterweight 80 will fall to the bottom most position and cause the indicating member to dispose itself in the centered position shown in FIG. 4. When fluid flows from either one of inlets 40 or 42, as for example, inlet 40, the fluid will pass through inlet trough connection channel 50 and into the left side of the arcuate trough 24, as viewed from FIG. 4 to urge vane counterweight 80 towards the right and thereby rotate indicating member 14. Markings on the face of indicating member 14 would indicate that the member is now in the right most position when viewed from FIG. 4. Similarly, if fluid flows from the other alternative source it would enter inlet 42 and force vane counterweight 80 to the left most position as viewed from FIG. 4, which then would be indicated by markings on the face of indicating member 14 as seen through cover 16.

This system could additionally be used to indicate the relative forces of two fluid streams to which the inlets 40 and 42 are connected since a net force will be effected against vane counterweight 80 by the stream with greater fluid pressure, which net force would be shown by the displacement of the indicating member as previously mentioned.

It should be noted that the construction set forth above provides a means for supporting the rotating member 14 with a minimum of frictional forces to impede the movement thereof. Specifically, the length of outer surface 84 of tubular section 78 is greater than the length of outer surface 23 of annular channel 22. Therefore, there is no contact between the back face 90 of conical front section 76 of the indicating member, and flat surface 20 of the base member 12. This is of significance in that it reduces any possibility of frictional contact between the two surfaces which might impede the free rotational displacement of indicating member 14.

Additionally, the entire length of indicating member 14 from the end of tubular section 78 to the tip of nib 86 is shorter than the distance from the bottom of annular channel 22 to the receptacle 88. Therefore, when the fluid indicating device is installed on a vertical mounting panel, rotating member 14 will soon move to a position in which there is no contact between the adjacent end surfaces of the indicating member and the base member, namely the faces of tubular section 78 and vane counterweight 80 and the bottom of circular channel 22 and arcuate trough 24. Indicating member 14 will then be in contact with the rest of the indicating device only at two locations. One location will be the upper most portion of the inner surface 82 of tubular section 78 which would be resting on mounting trunnion 26. The other location will be at nib 86 which is resting in receptacle 88.

In FIG. 7 is shown another embodiment of the invention which is constructed so as to minimize the area of frictional contact between the rotating member 14 and the remainder of the device to an even greater extent than that previously described. The area of support for the rotating member is reduced even further by tapering the outer surface 92 of mounting trunnion 94 and the inner surface 96 of tubular section 98. Once a small distance is established between the ends of tubular section 98 and the bottom of annular channel 22, a space will be present between the conical surface of mounting trunnion 94 and conical surface of tubular section 98 to form a much looser fit between these members. This looser fit will allow for even easier relative rotation of these two members and further insure that there will be no sticking or binding between the rubbing surfaces during rotational displacement of the indicating member.

Figure 10:
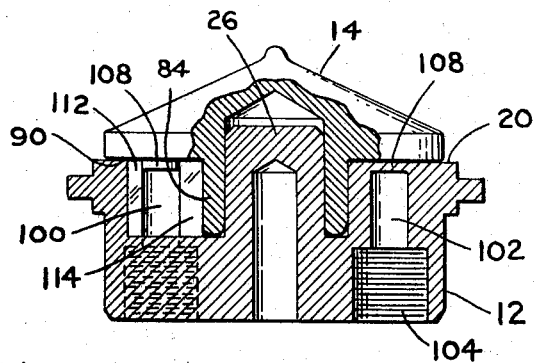
FIG. 10 is a side elevation in cross section taken along lines 10—10 of FIG. 9.
Figure 11:
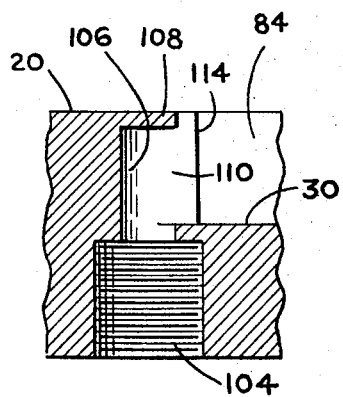
FIG. 11 is a sectional view of a portion of the device described herein taken along lines 11—11 of FIG. 10.

FIGS. 8, 9, 10 and 11 show another embodiment of the invention constructed to minimize the axial forces exerted on the rotating member 14 by the fluid entering the inlets to the visual indicator while maximizing the torque exerted by this fluid on the rotating member 14. As shown in FIGS. 10 and 11, the inlets in base member 12 are generally designated as 100 and 102 for the left and right inlets respectively with each inlet comprising a bore having a lower and upper section 102 and 104 respectively.

Section 104 is threaded for convenient attachment of hoses or pipes to the visual indicator while upper section 106 extends beyond bottom surface 30 of channel 22 and ends at cap 108 which is a continuation of the front surface 20 of the base member 12. A passage 110 connects the top of the inlet bore 106 with arcuate trough 24 to carry fluid from the inlet into the arcuate trough to act against the vane counterweight 80 of rotating member 14 to cause displacement of the rotating member.

Note that cap 108 prevents any of the incoming fluid flow from directly impinging upon the bottom surface 90 of the conical portion of rotating member 14. In so doing, cap 108 directs the incoming fluid flow in a direction generally perpendicular to the end walls 112 and 114 of arcuate trough 24 so that the fluid when entering the arcuate trough will be in a position to exert a near tangential force on vane counterweight 80 of rotating member 14 thereby effecting the maximum torque on the rotating member. The redirection of the incoming fluid flow from the vertical to the horizontal is of significance because it reduces the frequency of jamming of the device by reducing the tendency for the rotating member to be pushed askew on the mounting trunnion by the upward force of the incoming fluid. Additionally, by maximizing the torque acting on the rotating member 14, the sensitivity of the device is increased.

It should be noted that the conical configuration of the indicating member is a distinct advantage in that it allows the indicating member to be viewed from a 180° of vision whereas the conventional indicating members are viewed only from in front of the indicating device. However, in the construction set forth above since the entire cover can be made transparent or can have any type of design configuration placed thereon which could correspond to or coact with any design configuration placed on the surface of the indicating member such as the designs shown in FIG. 1, it would be possible to determine the position of the indicating member while looking at it from anywhere in the 180° field of view.

It will be understood that various changes in the details, materials and arrangements of parts which have been herein described and illustrated in order to explain the nature of the invention may be made by those skilled in the art within the principle and scope of the invention as expressed in the appended claims.

I claim:

1. An apparatus for sensing and indicating fluid flow in two separate flow conduits comprising:
   a casing having a mounting trunnion disposed thereon;
   an arcuate trough in the top of said casing concentrically disposed about said mounting trunnion;
   a first and second inlet in said casing for communicating fluid to opposite ends of said arcuate trough;
   an indicating member rotatably mounted on said trunnion;
   said indicating member including a vane depending therefrom disposed in said arcuate trough to rotate said indicating member in response to fluid entering said trough from said first and second inlet;
   said indicating member including a nib disposed coaxially with the rotational axis of said indicating member and remotely from said trunnion;
   a fluid tight cover connecting to the top of said casing to enclose said indicating member and to allow viewing of the position of said indicating member; and
   said cover having receptacle means therein adapted to receive and position the nib of said indicating member to support and position said indicating member during the rotational displacement thereof in response to the fluid entering said trough from said first and second inlets.

2. The combination claimed in claim 1 wherein:
   said nib point has a predetermined radius of curvature; and
   said cover having a generally conical configuration with said receptacle therein formed at the apex of the cone and having a radius of curvature slightly greater than the radius of curvature of said nib point.

3. The combination claimed in claim 2 wherein said trunnion is a frusto conical section protruding from said base; and
   wherein said indicating member includes, a generally right circular cylindrical extension;
   a frusto conical depression formed in said cylindrical extension to form a receptacle for said frusto conical trunnion; and
   the angle of conversion of said frusto conical trunnion and said frusto conical depression are approximately equal.

4. The apparatus claimed in claim 3 wherein said first and second inlet means are disposed in the rear of said base member and wherein means to position the recess in said cover to support and position said rotating member means comprise:
   stepped flange in said base circumferentially disposed about the axis of the base; and
   a cylindrical section formed in the cover member and continuous with the conical portion thereof, said cylindrical section adapted to coact with the stepped flange of said base to connect the cover to the base and thereby fix the location of the receptacle in said cover with respect to the axis of said trunnion mounting means in said base.

5. The combination claimed in claim 4 wherein the axial length of said rotating member is less than the distance between the base member and the cover member for accommodating said rotating member to allow axial play of said rotating member.

6. An apparatus for sensing and indicating fluid flow comprising:
   a casing having a planar surface thereon;
   an indicating member mounted on said casing to rotate in a plane generally parallel with the planar surface;
   a vane extending from said indicating member;
   a cover connected to the casing to enclose said indicating member;
   at least one inlet in said casing for communicating fluid to the planar surface of said casing; and
   each of said inlets constructed and arranged to direct the fluid entering from said inlet in a direction generally parallel to said planar surface and generally perpendicular to the radius drawn from the axis of rotation of said rotating member to said inlet.

7. The combination claimed in claim 6 wherein:
   said planar surface has an arcuate depression therein;
   said vane is disposed in said arcuate depression and travels therein during rotation of said indicating member; and
   each of said inlets comprising:
   a. a bore in said casing;
   b. a passage connecting said bore to said arcuate depression; and
   c. a cap at the end of said bore to direct fluid from said bore through said passage to said arcuate depression to cause said fluid to enter said arcuate depression in a flow path generally parallel to said planar surface.